United States Patent [19]

Foster

[11] Patent Number: 4,907,814
[45] Date of Patent: Mar. 13, 1990

[54] SELF-ADJUSTING BEARING

[75] Inventor: Peter M. Foster, Darlington, England

[73] Assignee: George Blair Public Limited Company, Great Britain

[21] Appl. No.: 314,553

[22] Filed: Feb. 23, 1989

[30] Foreign Application Priority Data

Mar. 3, 1988 [GB] United Kingdom ............... 8805124

[51] Int. Cl.$^4$ .............................................. B60G 5/00
[52] U.S. Cl. ........................... 280/104; 280/686; 384/192; 384/202; 384/215; 384/262; 384/273
[58] Field of Search ................... 280/104, 680, 686; 384/192, 202, 215, 262, 273

[56] References Cited

U.S. PATENT DOCUMENTS

| | | | |
|---|---|---|---|
| 3,246,911 | 4/1966 | Jurgens | 280/686 |
| 4,033,606 | 7/1977 | Ward et al. | 280/686 |
| 4,184,698 | 1/1980 | Raidel | 280/686 |
| 4,570,971 | 2/1986 | Perlini | 280/686 |

Primary Examiner—Kenneth R. Rice
Attorney, Agent, or Firm—Abelman Frayne Rezac & Schwab

[57] ABSTRACT

A self-adjusting bearing comprises an elongate body portion of compressible, resilient material of truncated conical shape with a central cylindrical bore formed therethrough. A plurality of independent segments of wear-resistant material are secured to the inner surface of the body portion to form a liner adapted to make bearing contact with a component received within the bore. The segments are each of arcuate transverse section, the side edges of adjacent segments being spaced from one another and the arrangement being such that, on location of the bearing in an associated, correspondingly-tapered bore whereby the body portion is radially compressed, the radial forces established within the body portion urge the segments of the liner into bearing contact with the component within the bore of the body portion.

4 Claims, 2 Drawing Sheets 4,907,814

SELF-ADJUSTING BEARING

BACKGROUND OF THE INVENTION

This invention relates to self-adjusting bearings and has particular, though not exclusive, application to such bearings for use in the suspension systems of articulated semi-trailers.

In a plain bearing and shaft assembly there must be physical clearance between the outside diameter of the shaft and the bore of the bearing so that the shaft can be fitted through the bearing.

The relative rotation that then takes place between the shaft and the bearing causes wear of the two components whereby the clearance between the shaft and the bearing can increase to unacceptable limits, at which stage one or other or both of the components must be renewed to restore the clearance to an acceptable value.

One application of such bearings is in the mechanical suspension systems fitted to articulated semi-trailers and the like.

More particularly, such suspension systems commonly comprise two or more axles suspended from the trailer chassis by means of springs and spring hangers. In order to share the load imposed on the suspension amongst the various axles, it is conventional practice to provide an equaliser assembly between adjacent axles, such an assembly including an equaliser which is pivotal about its own central axis relative to an equaliser bracket supporting the equaliser and whereby an imposed load is equally distributed between the associated axles.

The bearing on which the equaliser pivots may be one of two alternative designs.

In a first design, the equaliser is provided with a bore in which a hollow cylindrical bearing is an interference fit, the bearing comprising an outer resilient sleeve to which is bonded an inner sleeve of wear-resistant material. A cylindrical pivot pin extends through the bearing to interconnect the equaliser with its supporting bracket whereby, in use, the equaliser and bearing rotate relative to the pivot pin.

Such an arrangement provides relatively good equalisation of axle loads due to the relatively low friction between the bearing and the pivot pin but, as detailed above, there is considerable wear between the bearing surfaces which necessitates frequent replacement of the bearing to maintain acceptable clearances.

In an alternative design, the bearing comprises a pair of hollow fructo-conical bushes mounted on a cylindrical pivot pin with their tapered surfaces extending longitudinally of the pin and tapering inwardly towards the centre of the pin. The bushes each comprise an outer frusto-conical portion of resilient material and a central sleeve of wear-resistant material bonded into said outer portion, the bushes being housed within correspondingly-tapered bores in the equaliser and the equaliser bracket.

A clamping assembly on the pivot pin compresses the bushes axially whereby the resilient outer portion of each bush is a friction fit in the associated bore, the axially outermost part of said resilient portion with the bore in the equalier bracket and the axially innermost part of said resilient portion with the bore in the equaliser.

In such an arrangement, the rotation of the equaliser relative to its bracket is under the control of the resilient portion of each bush and in particular the torsion set up therein between the axially innermost part of the bush which rotates with the equaliser and the axially outermost part thereof which remains stationary with the bracket.

Although wear between the bearing surfaces does not occur in such an arrangement, a reduced axle-equalisation effect can result due to the torsional rate of the outer portion of the bush. In some instances, the peak loads experienced by the equaliser assembly can overcome the friction between the outer portion of a bush and the tapered bore in which it is received which results in the equaliser rotating relative to the bush and thereafter adopting a rest position angularly displaced from the normal rest position. Thus, once the peak load is removed, the equalisation effect is no longer correct, in that a torsional load imposed on the equaliser by the bush has to be overcome before it can adopt its normal rest position.

In the use of bearings incorporating an outer resilient sleeve to which is bonded an inner sleeve of wear-resistant material, the bearing is commonly an interference fit in an associated bore, and the effect of the bearing on the associated component rotating therein is very dependent upon the accuracy of machining of said bore and the provision therein of a smooth surface for engagement by the outer surface of the resilient sleeve. Accurate machining can be a costly and time-consuming exercise.

SUMMARY OF THE INVENTION

It is an object of the invention to provide a bearing capable of compensating for wear between the bearing and a bearing surface and which is as effective whether the associated bore in which it is housed is of smooth or rough finish—such a bearing could be applicable to suspension systems in such a manner as to improve both the equalisation effect in the equaliser system and to increase the service life of the components of the system, and would eliminate the necessity for accurate machine-finishing of the associated bore in which the bearing is received.

According to the present invention there is provided a self-adjusting bearing comprising an elongate body portion of compressible, resilient material and of substantially annular shape in transverse section, having inner and outer surfaces thereto, and a liner of wear-resistant material secured to, substantially to envelop, said inner surface of the body portion, characterised in that the elongate body portion is of truncated conical shape with a cylindrical bore formed centrally therethrough in which the liner is secured to react on a component received within said bore to undergo rotation relative to the bearing, the liner including a plurality of independent segments of arcuate transverse section the side edges of adjacent ones of which are spaced from one another and the surfaces of which remote from the body portion define the bearing surface of the bearing, the arrangement being such that, on location of the bearing in an associated correspondingly-tapered bore whereby the body portion is radially compressed, the radial forces established within the body portion urge the segments of the liner into bearing contact with said component.

It will be appreciated that, with such an arrangement and as wear occurs between the liner and said component, the segments of the liner are moved radially relative to the component by virtue of the compression of the material of the body portion to maintain bearing contact with said component, the independent nature of the segments and the spacing therebetween permitting independent movement of the segments and preventing interference of said segments with one another on said movements.

Preferably the opposed end edges of each segment lie in transverse planes through the body portion and the side edges of each segment extend parallel with the central longitudinal axis of the body portion, the segments thus being of generally rectangular shape in plan view and the spaces between adjacent segments extending longitudinally of the bearing.

Alternatively the side edges of the segments may be angularly offset from the longitudinal central axis of the body portion whereby the spaces between adjacent segments are of part-helical shape.

DESCRIPTION OF THE PREFERRED EMBODIMENT

Figure 1:
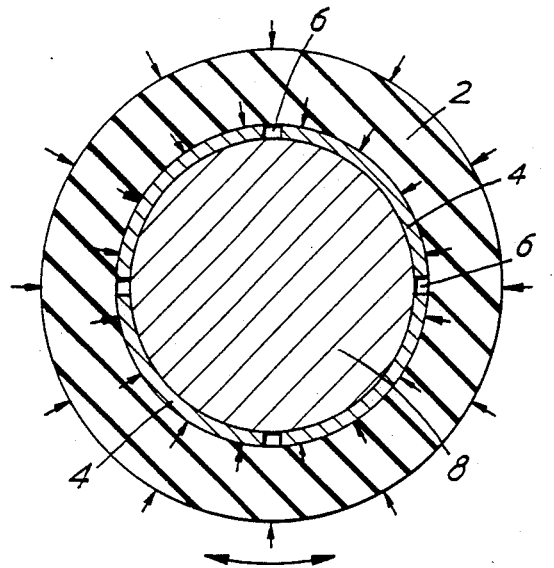
FIG. 1 is a transverse section through a bearing according to the invention.
Figure 2:
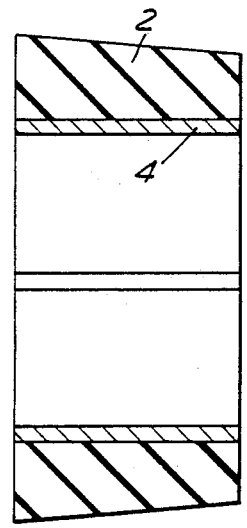
FIG. 2 is a longitudinal section through the bearing of FIG. 1.
Figure 3:
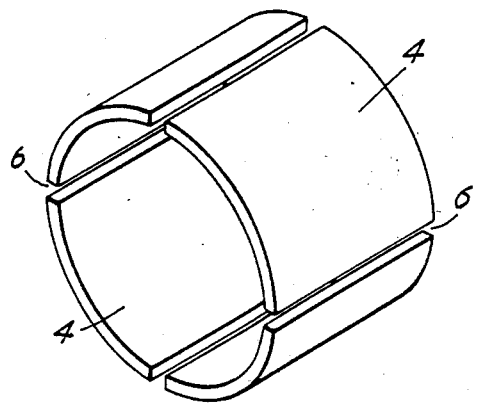
FIG. 3 shows the segments of the bearing of FIGS. 1 and 2.
Figure 4:
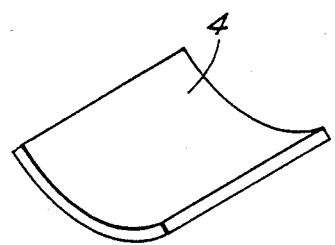
FIG. 4 shows one of the segments of FIG. 3.

Referring to FIGS. 1 to 4, the illustrated bearing comprises a body portion 2 of truncated conical shape having a cylindrical bore formed centrally therethrough and of a resilient, compressible material such as polyurethane, rubber or the like. Bonded to the inner wall of the body portion 2 are four segments 4 of wear-resistant material such as nylon or the like, each segment 4 being of generally quadrant shape in transverse section. The adjacent side edges of adjacent segments 4, which edges extend parallel with the central longitudinal axis of the body portion 2, are spaced from one another whereby parallel gaps 6 are formed between the segments 4.

In use, the described bearing is mounted on a shaft 8 or like cylindrical member with the bearing surfaces of the segments 4 mating with the surface of the shaft 8. The bearing is adapted to be housed in an aperture of corresponding shape but of smaller dimensions than the bearing whereby the body portion 2 is radially compressed as indicated by the arrows in FIG. 1. Thus the segments 4 are resiliently urged into said mating contact with the shaft 8 whereby, as wear to the shaft 8 and/or the segments 4 occurs, the resilient radial force from the compressed body portion 2 imposed upon the segments 4 urges them radially inwardly to maintain said mating contact with the shaft 8. The provision of the gaps 6 between adjacent segments 4 not only permits independent movement of the segments 4 but prevents interference between adjacent segments 4 on said radially inward movement thereof.

Thus it will be appreciated that the construction of the described bearing is such that the bearing is effectively self-adjusting and automatically compensates for wear between the bearing surfaces of two relatively rotating components.

Further, the frusto-conical nature of the body portion 2 is such that the mating bore into which the bearing is urged need not in itself be of an accurate, machined profile but may be of a relatively rough or non-machined finish—radial compression of the body portion 2 will be effected whether or not there is total contact between the mating surfaces of the body portion 2 and the receiving bore.

One application of the above described bearing is in the equaliser assembly of a multi-axle trailer suspension system.

Figure 5:
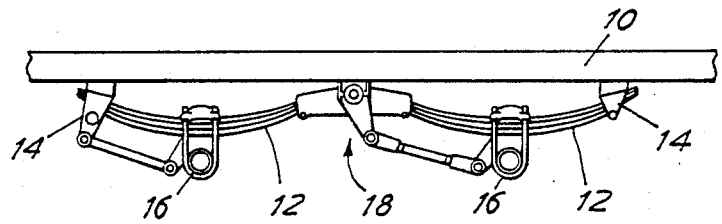
FIG. 5 shows part of the suspension system of an articulated semi-trailer the equaliser system of which incorporates a bearing according to the invention.

Referring to FIG. 5, there is shown part of a trailer chassis 10 the suspension of which comprises springs 12 and spring hangers 14 supporting a pair of axles 16. An equaliser assembly indicated generally at 18 shares the imposed load on the trailer between the two axles 16, said assembly including a fixed equaliser bracket in which is pivotally mounted an equaliser.

Figure 6:
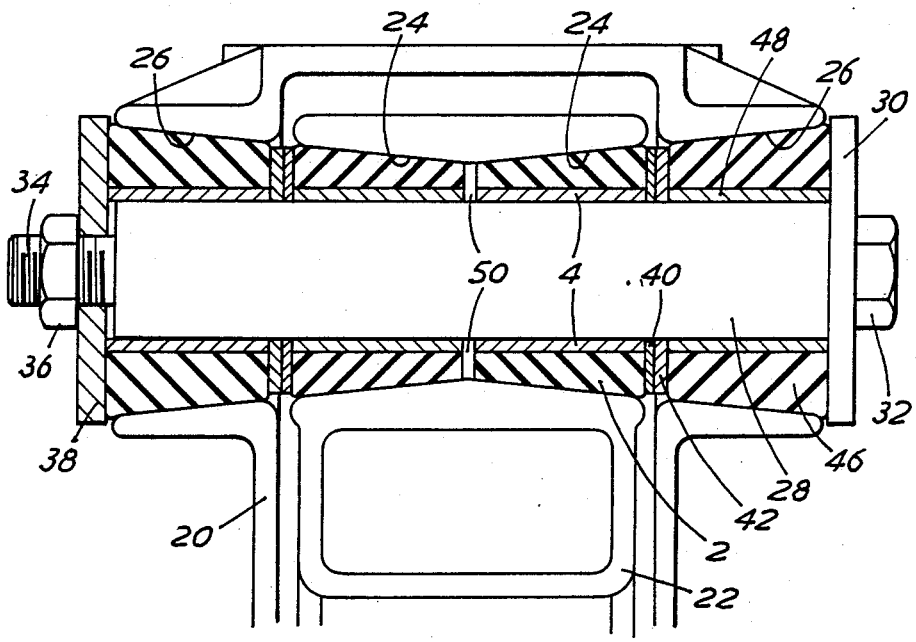
FIG. 6 is a longitudinal section through an equaliser assembly of the suspension of an articulated semi-trailer and incorporating bearings according to the invention.

FIG. 6 shows the pivotal mounting of the equaliser 22 in the equaliser bracket 20 in more detail.

The equaliser 22 is formed with a pair of communicating bores 24 therein one extending from each side of the equaliser and tapering towards the centre of the equaliser, while each side of the equaliser bracket 20 is provided with a similarly tapering bore 26 forming a continuation of the tapering bore 24 in the associated side of the equaliser 22.

Figure 7:
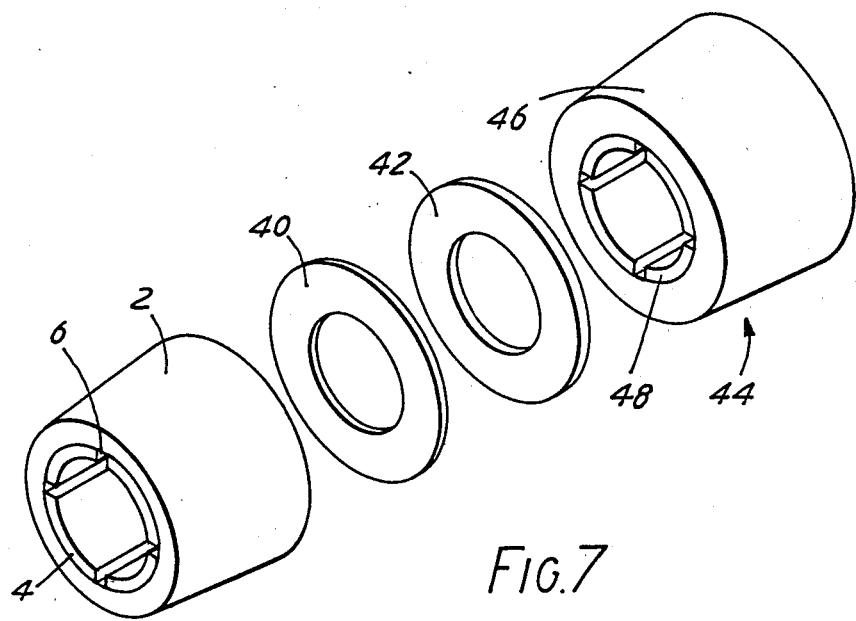
FIG. 7 shows a bearing assembly of FIG. 6 in exploded form.

The pairs of bores 24,26 each house therein a bearing assembly as shown in FIG. 7, the assemblies being mounted on a cylindrical pivot pin 28 extending through the equaliser assembly and including an end plate 30 and head 32 integrally formed on one end thereof, the other end 34 thereof being threaded and carrying a nut 36 and washer 38.

More particularly, each assembly comprises a bearing according to the invention adapted to be housed within a bore 24, a pair of thrust washers 40,42 and a frusto-conical thrust block 44 adapted to be housed within a bore 26, the thrust block 44 including a resilient body portion 46 in the cylindrical bore of which is bonded a sleeve 48.

In use, and on tightening of the nut 36 to secure the pivot pin 28 and the bearing assemblies in their operative positions, the bearings and thrust blocks 44 are axially compressed between the plate 30 and the washer 38 to urge said components into their associated bores 24,26, said axial compression creating radially-directed forces within the elastic medium of the body portions 2 of the bearings which act to compress the segments 4 towards the pivot pin 28 and to effect an interference fit of the body portions 2 within their bores 24. In the same manner, the body portions 46 of the thrust blocks 44 fit within their bores 26.

With such an arrangement, the equaliser 22, together with the bearings therein, rotates relative to the fixed pivot pin 28, equaliser bracket 20 and thrust blocks 44, the thrust washers 40 rotating with the equaliser and sliding on the associated stationary thrust washers 42.

As wear occurs between the segments 4 and the pivot pin 28, the compressed elastic medium of the body portions 2 maintains bearing contact between said components. Once all the compressive elastic self-adjustment in the body portions 2 of the bearings has been utilised to compensate for wear, further tightening of the nut 36 on the pivot pin 28 will re-establish compression of the body portions 2, there being a gap 50 between the adjacent end faces of the two bearings to accommodate the necessary axial movement of the bearings on re-compression. Alternatively or additionally, compression can be re-established by introducing one or more additonal thrust washers between each bearing and its associated thrust block 44.

Such an arrangement provides a good equalisation of axle loads because of the relatively low friction between bearing surfaces while automatically compensating for relative wear between said bearing surfaces, and can conveniently be used as a direct replacement for the alternative design detailed above, thereby overcoming the torsional problems associated with said alternative design.

In the above-described embodiment, and in order to minimise bearing wear, the gaps 6 between adjacent segments could be filled with a suitable lubricant on installation and at service intervals.

It will be appreciated that the precise construction of the illustrated arrangement can vary from that shown. In particular the thrust blocks 44 could be of other designs providing axial clamping thereof establishes the desired radial forces in the resilient body portions 2 of the bearings.

Although the above example details the bearing of the invention being applied to vehicle suspension equaliser assemblies, said bearings are equally applicable to other regions of mechanical or air suspensions of automotive vehicles. Further, it is to be emphasised that the bearings have numerous applications other than in suspension systems wherever rotation or oscillation between two components occurs—for example as flexible bushes in the track links of tracked vehicles. Additonally, the invention has application to other than plain bearings, for example ball/roller bearings.

Referring to the bearings themselves, the segments 4 may be other than rectangular in plan view and may be, for example, triangular or the like with the gaps 6 extending other than parallel with the longitudinal axis of the bearing, for example, part-helically of the bearing.

Thus there is provided a self-adjusting bearing which is capable of compensating for wear between the bearing and bearing surface and which can be located in a roughly-finished bore without affecting the operation of the bearing.

What I claim and desire to secure by Letters Patent is:

1. A self-adjusting bearing comprising an elongate body portion of compressible, resilient material and of substantially annular shape in transverse section, having inner and outer surfaces thereto, and a liner of wear-resistant material secured to, substantially to envelop, said inner surface of the body portion, the elongate body portion being of truncated conical shape and defining a cylindrical bore centrally therethrough in which the liner is secured to react on a component received within said bore to undergo rotation relative to the bearing, the liner including a plurality of independent segments each of arcuate transverse section and having side edges thereto, the side edges of adjacent segments being spaced from one another, and the segments having surfaces remote from the body portion which define the bearing surface of the bearing, the arrangement being such that, on location of the bearing in an associated, correspondingly-tapered bore whereby the body portion is radially compressed, radial forces are established within the body portion which urge the segments of the liner into bearing contact with said component.

2. A bearing as claimed in claim 1 in which the segments each have opposed end edges which extend parallel with the central longitudinal axis of the body portion, the segments being of generally rectangular shape in plan view and the spaces between adjacent segments extending longitudinally of the bearing.

3. A bearing assembly comprising a bearing as claimed in claim 1 together with a thrust block and a pair of thrust washers between the adjacent end faces of the bearing and the thrust block, the arrangement being such that, in use, the thrust block is loaded to apply an axial force to the body portion of the bearing within its associated bore whereby said radial forces are established within the body portion of the bearing.

4. An equaliser assembly for a vehicle suspension system, the equaliser assembly comprising an equaliser bracket, a pivot shaft fixed to said equaliser bracket, and an equaliser pivotal relative to the equaliser bracket about said pivot shaft, at least one bearing assembly as claimed in claim 1 being provided between the equaliser and the pivot shaft.

* * * * *